June 23, 1970 M. RIBNER 3,517,137

COMBINATION VOICE AND DATA TELEPHONE SUB-SET

Filed March 29, 1966 3 Sheets-Sheet 1

INVENTOR
MORRIS RIBNER
BY [signature]
ATTORNEY

COMBINATION VOICE AND DATA TELEPHONE SUB-SET

Filed March 29, 1966 3 Sheets-Sheet 3

United States Patent Office 3,517,137

Patented June 23, 1970

3,517,137

COMBINATION VOICE AND DATA TELEPHONE SUB-SET

Morris Ribner, Chicago, Ill., assignor to International Telephone and Telegraph Corporation, New York, N.Y., a corporation of Delaware Filed Mar. 29, 1966, Ser. No. 538,420

Int. Cl. H04m *1/00, 11/00, 3/00*

U.S. Cl. 179—81 16 Claims

ABSTRACT OF THE DISCLOSURE

A circuit is provided to enable the transmission of voice and data over the same four-wire telephone system. Ringing and other signals needed to establish voice circuits, which could cause spurious responses in data equipment, are generated locally.

This invention relates generally to telephone sets and more particularly to telephone sets which provide not only voice communication, but also data transmission.

In the past, telephone sets have provided voice paths which enabled people to talk to each other. Thus, telephone sets have been designed to provide the frequency band width, line balance, supervision, and the like, required by the characteristics of human speech. These sets have provided a function and had operating characteristics which were acceptable to human users.

Likewise, known telephone systems have been adapted to provide communication paths which enabled machines to "talk" to each other. Thus, for example, teleprinters, computers and the like, have been connected together via telephone lines to allow a free flow of coded signals between the machines. The systems which allow these machines to talk to each other are designed to provide the band width, line balance, supervision, or the like required by the characteristics of human speech. These sets these sets have been designed and built to a different functional and operational set of standards required by the machines.

Now, the communication arts have progressed to a point where the human and machine signals are carried by a single communication system and simetimes intermixed on a time assigned basis. This combination of signals imposes severe limitations on the design of the equipment. For example, the human speech signals are carried in a 3000 c.p.s. band width which goes down to 200 c.p.s., and the machine signals are carried on a wide band which goes from 15 c.p.s. up to about 108 kc. This variation between narrow and wide band makes it very difficult to balance the various circuits. Also, when an unbalance occurs, the telephone and speech signal processing equipment tends to hum or make frying sounds which the machines will interpret as data signals being sent to them.

Accordingly, an object of the invention is to provide new and improved combination voice and data sub-sets. In this connection, an object is to combine voice and data sub-set equipment without introducing noise or conditions of unbalance which would be disturbing to either human or machine "talk." A further object is to equip the sub-set to supervise both the voice and data equipment, with safeguards to reduce human error in operation.

Yet another object is to accomplish the foregoing objects at a minimum cost and with a minimum number of parts which might tend to cause troubles.

In accordance with an aspect of this invention, these and other objects are accomplished by a voice/data telephone sub-set circuit which combines the requirements for voice and data transmission. The circuit provides means for coupling the voice/data telephone into a four-wire transmission channel which is constructed to carry either a broad band of data signals or a narrow band of voice signals. To avoid an undue expense, the circuit is designed to use D.C. signalling over a simplex on the four-wire transmission channel and to use local power for providing ringing and similar current which might otherwise introduce noise into the commnuication channel.

The above mentioned and other features of this invention and the manner of obtaining them will become more apparent, and the invention itself will be best understood by reference to the following description of an embodiment of the invention taken in conjunction with the accompanying drawings, in which:

FIG. 4 is a layout sketch which shows how FIGS. 2, 3 should be joined to provide a complete and understandable schematic cirucit.

BRIEF DESCRIPTION

Figure 1:
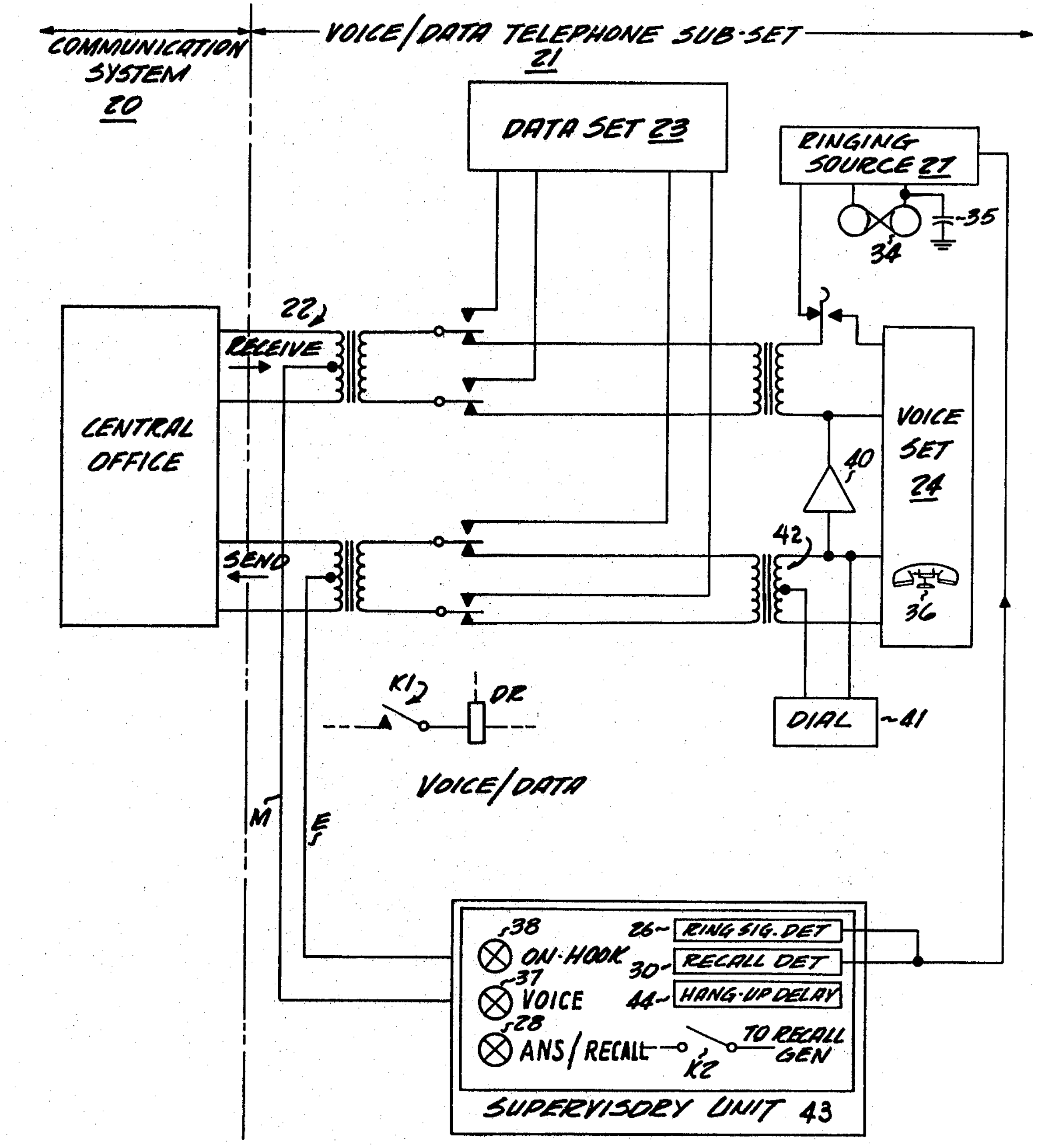
FIG. 1 is a block diagram of a voice/data telephone sub-set made in accordance with the teachings of this invention.

The broad principles of the invention should be apparent from a study of the block diagram of FIG. 1. The principal parts of this diagram are a communication system 20 (here generically called a "central office") joined to a voice/data sub-set 21 by a four-wire line 22. The voice/data sub-set 21 combines the requirements for human voice and "machine talk" data transmission. The data set, per se, is shown at 23 and the voice set at 24. Either the data set 23 or the voice set 24 may be connected to the transmission channel 22 by the operation or release of a voice/data relay DR under the influence of a manually controlled key K1.

To avoid excessive noise, the entire circuit is designed to use D.C. signalling over a simplex on the four-wire transmission channel 22. Responsive to these D.C. signals, ringing and other "noise" inducing types of signal currents are provided locally. More particularly, if a call comes in, a D.C. signal appears on a simplex using a send pair of the four wires and leading to the well known E-lead. A ringing signal detector 26 responds to this E-lead potential and sends a signal to a ringing source 27. The ringing source 27 then applies its output to cause a local power supply, such as commercial power, (not shown) to ring a bell. Also, a light 28 lights to identify the telephone which is ringing.

If it is necessary to recall a subscriber at the distant end of line 22, a D.C. recall key K2 is used to apply a signal to the well known M-lead, which is simplexed on the other two (receive pair) of the four-wire line 22. At the distant end of line 22, a recall detector, such as 30, operates to trigger the local ringing source. (The well known term "simplex" describes a circuit wherein a potential is applied to the center tap of a transformer winding so that the voltage divides equally between the two halves of the winding to produce equal and opposite, bucking magnetic effects. Thus, the electrical effects cancel out and are not induced across the transformer. The E and M leads are so connected).

The local ringing source is interrupted at a rate which is set by the operate and release time of a multivibrator 34. For example, this multivibrator could generate a cycle of one second of ringing current followed by three seconds of silence. However, if a call should occur at the start of a silent period, the rent on a leased line may become unduly expensive. To avoid the resulting ill will and inconvenience, a capacitor 35 is connected to normally hold the mutlivibrator 34 in a given condition to insure that it will energize its proper output to cause an instantaneous start of the ringing.

Upon hearing the ringing bell, the subscriber picks up a hand-set, thereby operating a set of hookswitch contacts HS controlled at 36. This act of operating hookswitch contacts causes a voice light (such as 37) to light at the user's end of the line 22. When the subscriber removes the handset at the distant end, the local answer lamp 28 lights at the near end of line 22. These lights are especially helpful in informing the subscriber about the state of his connection during times when the data sets are "talking" to each other.

In order to provide a side tone so that the subscriber can hear himself talk, an amplifier 40 is connected from the send to the receive channel. The level of amplification is set low enough to provide a net loss. Thus, the side tone loss is doubled if two voice sets 24 are connected together, and the system cannot break into oscillation or singing. In one exemplary system, there was an 11 db loss in the side tone signal strength inside amplifier 40, or a 22 db loss in a complete connection.

The dial 41 is of the voice frequency, pushbutton variety. The commercially available ones of these pushbutton devices generally require an interaction between the network of the standard telephone and the pushbutton controlled circuit. Since that network is not available in the voice set 24, the dial 41 is bridged across a part 42 of the voice coil. This simulates the network effect and reduces costs by allowing the use of commercially available components.

Each time that a subscriber hangs up, there is an opportunity for a false ringback seizure under certain unfavorable conditions. Thus, the supervisory unit 43 includes a hang-up delay circuit 44 which prevents the voice/data sub-set 21 from being reseized immediately. When this hang-up delay circuit 44 times out, the false ringback seizure period will have already expired.

DETAILED DESCRIPTION

Figure 2:
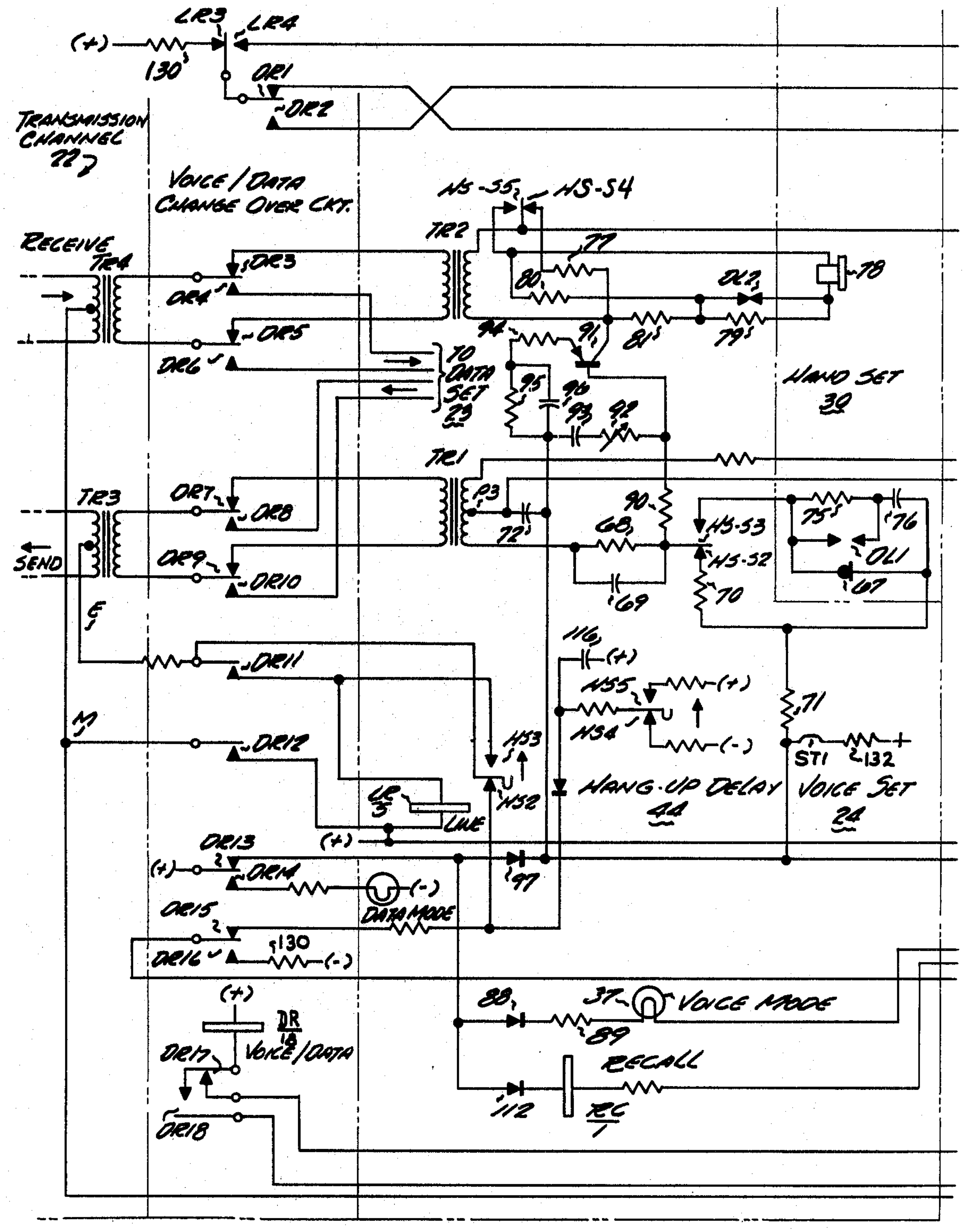
FIGS. 2 and 3 are a schematic diagram of the voice/data telephone sub-set shown in FIG. 1.
Figure 3:
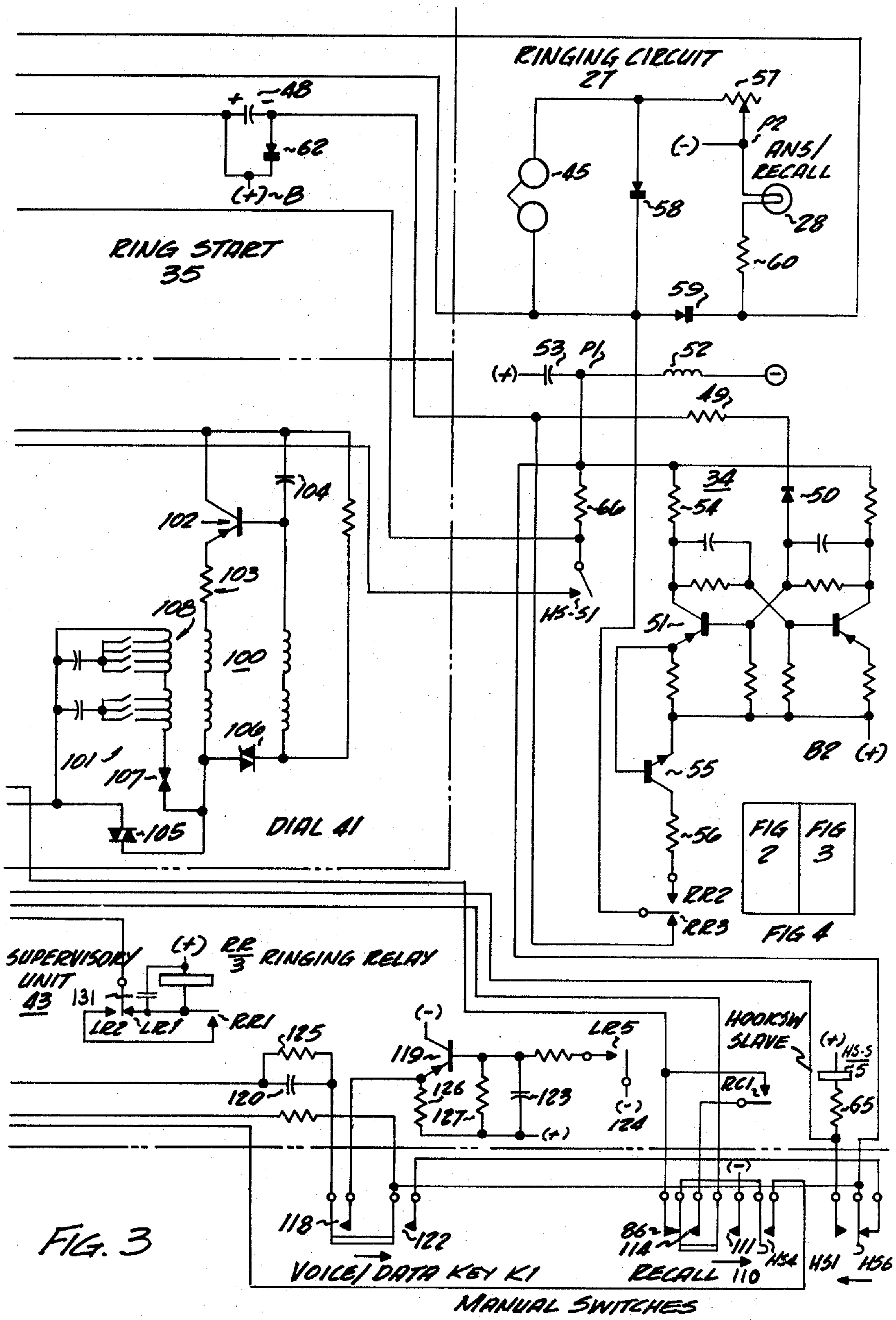

To help the reader, FIGS. 2, 3 have been divided by dot-dashed lines to generally conform with the blocks of FIG. 1. However, to avoid an undue jumble of wires, some components (such as lamps 28, 36, 37) appear at different locations in the two drawings.

Since all of the components are well known to those skilled in the art, it is thought that the invention will be understood best from a description of how it operates.

Ringing

An incoming call is signaled by an application of a D.C. negative battery potential applied to the E-lead from the simplex across the two wires of the SEND side of channel 22. Responsive thereto, a ringing relay RR operates over a circuit including contacts HS2, DR15, LR1, and the winding of the ringing relay RR to (+) ground. When ringing relay RR operates, it prepares a locking circuit for itself at its contacts RR1.

Means are provided for giving an immediate ringing signal responsive to the received D.C. signal on the E-lead. In greater detail, the ringing circuit 27 includes the multivibrator 34, a ring start circuit 35, a ringer 45, and associated components. Before a ring signal comes in, the ringing relay contacts RR3 are in the closed position shown in the drawing to apply a negative battery from point P2 to one side of capacitor 48, via the potentiometer 57, ringer 45, and contacts RR3 to the right hand side of capacitor 48. A positive battery B induces a charge on the other side of capacitor 48 with the resulting polarity distribution shown in the drawing. Thus, a negative potential is applied through a current limiting resistor 49 and a diode 50 to make the base of a PNP transistor 51 normally more negative than its emitter. Thus, in the normal state, the transistor 51 is turned on and saturated. A point P1 is also at a negative potential applied through a choke coil 52 with a filter capacitor 53 bypassed to ground. The filter capacitor also smooths any ripples or sudden voltage changes appearing at the point P1.

When the ring signal appears on the E-lead and the ring relay RR operates, the contacts RR2 close, and the contacts RR3 open. The multivibrator 34 is standing with the transistor 51 in an on condition owing to the polarity of the charge on the capacitor 48. Therefore, the negative potential at point P1 is now applied through resistor 54 and the collector-emitter circuit of transistor 51 to make the base of the transistor 55 more negative than its emitter. The transistor 55 turns on and current flows from a positive battery B2 through the emitter-collector circuit of the transistor 55, a current limiting and load resistor 56, operated ringing relay contacts RR2, the winding of ringer 45 and a ringing volume control potentiometer 57 to a negative battery at point P2. A diode 58 discharges the ringer winding quickly at the start of each silent period. The same positive battery B2 potential is also applied through the diode 59, resistor 60, and lamp 28 to the negative battery point P2. Lamp 28 lights to identify the telephone which is ringing.

Hence, it is seen that the ringer sounds immediately when a station is called because the potential on the charged capacitor 48 forces the multivibrator 34 to stand with the transistor 51 turned on. Those skilled in art will readily perceive how the flip-flop action of the multivibrator 34 will establish an interrupted ringing cycle. The diode 62 is poled to bypass to ground the positive voltage spikes generated by the multivibrator 34.

Answer

The subscriber who is being called hears his bell ringing and removes his hand-set to close the various hookswitch contacts designated HS and to operate a hookswitch slave relay HS–S over a circuit traced from the negative battery at the potential point P1 through operated hookswitch contacts HS–1, resistor 65, and the winding of relay HS–S to (+) ground.

Responsive to the operation of the hookswitch slave relay HS–S, the contacts HS–S1 close to apply the negative potential from the point P1 through a current limiting resistor 66 to a center tap point P3 on the send transformer TR1. This negative potential energizes the voice transmitter 67 via a circuit traced from point P3 through a current limiting resistor 68, hookswitch slave relay contacts HS–S3, transmitter 67, resistor 71, diode 97 and contacts DR13 to (+) ground potential. The contacts HS–S2 open to remove an idle line, impedance matching resistor 70, normally connected across the secondary winding of transformer TR1. This idle line termination may be traced from point P3 through the lower half of transformer TR1, the current limiting resistor 68, an A.C. bypass capacitor 69, contacts HS–S2, impedance matching resistors 70, 71, and diode 97 to (+) ground at contacts DR13. A set of dial off-normal contacts DL1 bypasses transmitter 67 through an impedance stabilizing and transmitter muting circuit including the resistor 75 and capacitor 76. The contacts HS–S4 open to remove an idle line termination 77 connected across the secondary winding of a voice transformer TR2. The contacts HS–S5 close to connect the receiver 78 across the secondary winding of transformer TR2 in lieu of the idle line termination 77. Coupled in series with receiver 78 is a set of off-normal dial contacts DL2 which insert or remove a resistor 79 for allowing and removing a decreased volume dialing so that the subscriber can faintly hear the tones that he sends. The resistors 80, 81 limit current.

Returning to the hookswitch operation, the contacts HS2 open to break the circuit to the ringing relay RR, which releases to open contacts RR2 and terminate ringing. The contacts HS3 close a circuit for operating the line relay LR via a path traced from the central office over the SEND pair, the E-lead, operated hookswitch contacts HS3, and the winding of line relay LR to (+) ground.

Talking

The telephone is now connected in its voice mode and the subscribers may talk to each other. To signify this mode of operation, a voice lamp 37 lights over a circuit traced from (+) ground through contacts DR13, diode 88, a current limiting resistor 89, lamp 87, and operated hookswitch contacts HS1 to the negative potential point P1.

The voice path for transmitting may be traced from point P3 through capacitor 69 in parallel with resistor 68, hookswitch contacts HS–3, resistor 75 and capacitor 76 in parallel with transmitter 66, resistor 71, and capacitor 72 to point P3. The voice signal induced across the transformer TR1 is transmitted through contacts DR7, DR9, and transformer TR3 to the SEND side of the line 22.

The voice path for listening begins at the RECEIVE side of line 22. Voice signals are induced across the transformer TR4, through the contacts DR3, DR5 (in parallel) and across the transformer TR2. On the secondary side of the transformer TR2, the voice signals circulate through a loop including resistors 81, dial contacts DL2, the receiver 78, and hookswitch slave relay contacts HS–S5.

Means are provided for giving side tone to the subscriber so that he can hear himself talking. In greater detail, after the subscriber station goes off-hook, a bias potential is applied from the point P1, through the resistor 66, contacts HS–S1, point P3, the resistors 68 and 90 to the base of a PNP transistor 91 coupled in a common emitter configuration. An adjustable resistance 92 controls the volume level of the side tone. A capacitor 93 provides D.C. isolation. The emitter bias is established by two series connected resistors 94, 95 coupled to (+) ground on contacts DR13. A capacitor 96 bypasses part of the emitter bias circuit to provide a controlled amount of negative fedback. Thus, as the subscriber talks into the microphone 67, a speech signal is applied through the resistor 90 to the base of the transistor 91. The voice signal thereupon appears in the current flowing through the emitter-collector of the transistor 91, and the receiver 78.

Dialing

Means are provided for transmitting dial control signals over the transmission channel 22. In greater detail, the dial is the well known pushbutton, multifrequency assembly now being widely used on commercial telephones. The dial assembly includes the usual magnetics 100, the usual digital pushbuttons 101, a common emitter amplifier 102, a current limiting and negative feedback resistor 103, a tank circuit capacitor 104, and voltage limiting varistor devices 105, 106. In addition, the dial includes a set of contacts 107 which keep the winding 108 charged so that there will be a fast response when one of the digit keys 101 is pushed. Since all of these components are standard parts of well known, commercially available devices, nothing further need be said about them. Whenever a digit key is pushed, dial contacts DL1 close to short circuit and mute the transmitter so that there will be no interference with the dial pulsing. The contacts DL2 open short circuiting resistor 79 so that the subscriber can faintly hear the tones.

Recall

After the system is switched to the data, it is sometimes necessary to call in a human. For example, the data machines may either finish transmission or encounter trouble. Or, the operators may wish to cancel the data mode and go into voice mode for any arbitrary reason.

Regardless of the reason for recall, the process is initiated by operating a recall key 110. Contacts 86 open to break a connection through operated hookswitch contacts HS4 to the M-lead and thereby send a D.C. signal to the distant station. Contacts 111 close a circuit to a slow-operate recall relay RC over a path traced from (−) battery through contacts 111, the winding of the relay RC, an isolating diode 112, and contacts DR13 to (+) ground. After an opening pulse having a predetermined period, the recall relay operates and closes contacts RC1 to re-energize the M-lead. Thus, the M-lead is open for a pulse equal to the operate time of relay RC.

The pulse which is so sent over the M-lead causes a similar pulse on the E-lead connected into the distant subscriber set. If the recall key is being used, it means that a connection is already established; otherwise, the switch path would be set up originally with the usual automatic ringing. Also, the distant telephone is on-hook; otherwise, the subscribers would be talking, and there would be no reason for recall. Thus, the distant station is almost certainly in the data mode and the contacts DR11, DR12 are closed.

The interruption of the E-lead opens the circuit to the line relay LR, which releases. Contacts LR1 close, and ring relay RR operates over the circuit from (+) ground through its winding, contacts LR1, and DR16 to (−) battery. The operation of the ring relay RR causes the distant station to ring in the above described manner. Relay RR closes its contacts RR1, and holds operated via contacts LR2 after line relay LR reoperates. When the subscriber at the distant station operates a switch to change from the data mode to the voice mode, contacts DR16 open and contacts DR15 close to release the ring relay RR and thereby terminate ringing.

Hang-up delay

To avoid certain circumstances when it would be possible to ring back immediately after hang-up, a connection delay inhibiting circuit 44 is provided. In greater detail, when the station is off-hook, the hookswitch contacts HS–5 are closed and (+) ground is applied to both sides of a large capacitor 116. When the station goes on-hook, contacts HS–5 open and contacts HS–4 close. The capacitor 116 charges to the potential of the (−) battery. Note that the charging circuit to capacitor 116 is in parallel with the circuit through contacts HS2 to the E-lead. The circuit values are such that the incoming potential on the E-lead cannot operate the ringing relay RR until after the capacitor 116 is sufficiently charged. This period of time required for capacitor 116 to charge is longer than the period of time during which ringback may occur.

Data mode

To place the sub-set in the data mode the key K1 is operated. If the line relay LR was operated before key K1, contacts LR5 were closed before contacts 118 closed. Therefore, a capacitor 123 was charged when contacts 118 were closed. The transistor 119 conducts, and capacitor 120 charges. The resulting voltage change across the capacitor 120 operates a voice/data relay DR via contacts DR17. Relay DR then locks via a circuit traced from (+) ground through contacts DR18, 122, and the hookswitch contacts HS6 (on-hook condition) to the negative potential point P1.

Means are provided for preventing the operation of the voice/data relay DR if a call comes in while the subscriber station is in the data mode. In greater detail, assume that a subscriber has previously operated the voice/data switch and then forgotten to restore it. The line relay LR operates and contacts LR5 close at a time when contacts 118 are closed. The capacitor 123 is large and soaks-up the current coming from battery 124 after the contacts LR5 close. Thus, there is no sudden voltage change at the base of the transistor 119. The transistor comes on slowly and the voltage rises slowly through contacts 118. The slow rising wave front does not pass through the capacitor 120. The resistor 125 decreases the voltage reaching the relay DR to a level which prevents its operation. Resistors 126, 127, respectively, provide bias for the emitter and base, respectively, of the transistor 119.

Means are provided for causing the station to react as if it were in the voice mode, even if it is in the data mode, when a call is received. This feature may be seen best by briefly reviewing the operation which was just described.

If a call comes in while the voice/data switch K1 is in the voice mode, contacts LR5 close and capacitor 123 charges slowly to its full value. Thereafter, the voltage on the emitter of transistor 119 is standing at about (−) 45 volts, in one exemplary system. When the voice/data switch 117 is thereafter operated, contacts 118 close and substantially the full (−) 45 volts is applied to capacitor 120 with virtually a square rising wave front. The capacitor 120 bypasses this fast rising voltage around the resistor 125. Thus, substantially the full (−) 45 volts appears at the winding of relay DR, which operates and locks. On the other hand, if the voice/data telephone sub-set is in the data mode when a call comes in, the contacts 118 are closed at a time which is before the line relay LR operates. The emitter of transistor 119 stands at (+) ground potential. When contacts LR5 do close, capacitor 123 slows the response time of the transistor 119. Emitter voltage on the transistor 119 changes very slowly as it rises from (+) ground to (−) battery. The slowly rising voltage is blocked by capacitor 120, and it cannot bypass resistor 125. The voltage appearing at contacts DR17 is reduced by the IR drop across resistor 125, and it cannot operate the voice/data relay DR.

When the voice/data relay DR is not operated, the contacts DR1–DR18 are in the position shown in the drawing and the circuit operates in the voice mode, as described above. When the voice/data relay DR is operated, the contacts DR operate from the position shown in the drawing to close the contacts which are shown in an open position in FIGS. 2 and 3. Then, the data set is connected to line 22 via the contacts DR4, DR6, DR8, DR10.

Means are provided for giving a continuous alarm if the sub-set is in a data mode during a disconnect condition. In greater detail, the line relay LR is operated when a connection is completed over the transmit channel 22 to the station. Thus, an alarm condition exists if line relay LR is released and voice/data relay DR is operated. The alarm circuit extends from (+) ground, through a current limiting resistor 130, contacts LR3, DR2, ringer 45, and potentiometer 57 to (−) battery at point P2. The bell rings until someone returns key K1 and thereby opens contacts 122 to release relay DR and open contacts DR2. If both the line relay LR and the voice/data relay DR are released, the circuit through contacts LR3, DR1 extends from (+) ground to (+) ground, and there are no practical results.

If the line relay LR is operated and the data relay DR is unoperated, it means that there is a connection to the distant end of line 22, and the system is in the voice mode. This is signified by a lit lamp 28, the circuit extending from a (+) ground B, through the contacts DR1, LR4, resistor 60 and the lamp 28 to (−) battery. This light goes out during the recall interval while the line relay LR is released. If both the line relay LR and the voice/data relay DR are operated, both ends of the alarm circuit are connected to (−) battery, and there are no practical results.

Several other features are provided by the circuit shown in the drawing. First, an incoming recall signal appears as an interruption of current on the E-lead. Marginal conditions could occur if the ringing relay RR cannot operate reliably during this period of interruption.

Means are provided for stretching the effective period of an incoming recall pulse to guard against marginal operating conditions. In greater detail, when line relay LR restores, circuit is completed from (−) battery through resistor 130, contacts DR16, contacts LR1 and a large capacitor 131 to (+) ground. The capacitor charges. If the E-lead is re-energized before ringing relay RR is completely operated and locked, the charge on the capacitor 131 continues to supply power to complete the relay operation. The resistor 130 prevents contacts damage as a result of the current through the capacitor 131.

Another feature of the invention provides means for using the voice set independently of the data set. For example, the user may want to talk over a local intercom while the equipment is in a data mode and the machines are talking to each other. If this option is desired, the bottom of resistor 71 (as shown in the drawing) is connected to ground via strap ST1 and a resistor 132. Then, the transmitter 67 is energized while the contacts DR13 are open.

Yet another feature of the invention guards against human error after the voice/data key K1 has been operated to the data mode. If the subscribers switch to the data mode, they will operate the voice/data key K1. This operates the voice/data relay DR which locks at its contacts DR18. This operation, in turn, completes a holding circuit through contacts 122 and HS6, in parallel, to the negative potential point P1. If the subscriber thereafter absentmindedly returns the voice/data key K1 to the voice mode position, the voice/data relay DR continues to be held via hookswitch contacts HS6, and there is no adverse effect. On the other hand, if the subscriber absentmindedly picks up the telephone hand set while the voice/data key K1 is in the data mode, there is no adverse effect because contacts 122 hold the voice/data relay DR operated. The only way of releasing the data mode is to perform the two acts of releasing the voice/data key K1 and going off-hook. This combination of events serves as a human reminder.

While the principles of the invention have been described above in connection with specific apparatus and applications, it is to be understood that this description is made only by way of example and not as a limitation on the scope of the invention.

I claim:

1. A voice/data telephone set comprising means for connecting said telephone set to a four-wire transmission channel, contact means interposed between said transmission channel and said set for selecting a voice or a data mode of operation, means for coupling two simplex signal circuits across said four-wire line, one of said simplex circuits being coupled across a first pair of said four-wire line and the other of said simplex circuits being coupled across a second pair of said four-wire line, means for sending D.C. signals over said simplex circuits, and means in said telephone set for locally generating supervisory signals responsive to received D.C. signals arriving over one of said simplex circuits.

2. The telephone set of claim 1 and means whereby said set supplies locally generated ringing current responsive to the received D.C. signals.

3. The telephone set of claim 1 and means for locally supplying interrupted ringing current responsive to the received D.C. signals indicating an incoming call.

4. The telephone set of claim 3 and means for giving an immediate ringing signal responsive to the received D.C. signals indicating an incoming call, and means for thereafter supplying said interrupted ringing current in a normal cycle.

5. The telephone set of claim 1 and means for giving side tone to said set comprising an amplifier coupled from one pair of said four wires to the other pair of said four wires, said amplifier having a gain which is less than unity.

6. The telephone set of claim 1 and means responsive to D.C. signals received over said simplex circuits from a distant station for producing a recall signal at said set only when the set is in said data mode.

7. The telephone set of claim 1 and means responsive to a hang-up condition for providing a connection inhibiting delay signal during a predetermined delay period of time.

8. The telephone set of claim 1 and switching means operable for preventing a data response if said set is called while it is in a data mode.

9. The telephone set of claim 1 and signaling means for giving a continuous alarm if said set is in its data mode while it is disconnected from a distant station.

10. The telephone set of claim 1 and switching means responsive to the receipt of a call while said set is in a data mode for causing it to respond as if it were in a voice mode.

11. The telephone set of claim 1 and means, including a slow to operate relay, for prolonging an incoming recall signal to insure a complete response thereto.

12. The telephone set of claim 11 wherein said prolonging means comprises also a capacitor charged responsive to receipt of said recall signal, and means for discharging said capacitor responsive to the termination of said recall signal.

13. The telephone set of claim 1 and means for using the voice set independently of the data set.

14. The telephone set of claim 13 and means, including open relay contacts, for guarding against loss of data through human error when said telephone set is in a data mode.

15. The telephone set of claim 14 wherein said means for guarding against human error precludes the placing of a call while said set is in a data mode.

16. The telephone set of claim 14 wherein said means for guarding against human error precludes the cancellation of said data mode responsive to an operation of the key from data mode to voice mode while said set is in an off-hook condition.

References Cited

UNITED STATES PATENTS

| | | | |
|---|---|---|---|
| 3,066,195 | 11/1962 | Stern et al. | 179—84 |
| 3,130,274 | 4/1964 | Norling et al. | 179—81 |

WILLIAM C. COOPER, Primary Examiner

U.S. Cl. X.R.

179—2, 18